United States Patent
Nakamura et al.

(10) Patent No.: US 7,800,261 B2
(45) Date of Patent: Sep. 21, 2010

(54) ROTARY ELECTRIC MACHINE WITH STATOR OUTER SURFACE DESIGNED TO ENHANCE HEAT DISSIPATION

(75) Inventors: Shigenobu Nakamura, Anjo (JP); Seiji Kondoh, Nagoya (JP)

(73) Assignee: Denso Corporation, Kariya (JP)

( * ) Notice: Subject to any disclaimer, the term of this patent is extended or adjusted under 35 U.S.C. 154(b) by 1070 days.

(21) Appl. No.: 11/487,424

(22) Filed: Jul. 17, 2006

(65) Prior Publication Data
US 2007/0013259 A1    Jan. 18, 2007

(30) Foreign Application Priority Data
Jul. 15, 2005    (JP)    ............................. 2005-207101

(51) Int. Cl.
*H02K 9/00*    (2006.01)

(52) U.S. Cl. .......................................... 310/58; 310/52

(58) Field of Classification Search ................... 310/52, 310/54, 58, 64
See application file for complete search history.

(56) References Cited

U.S. PATENT DOCUMENTS

| | | | |
|---|---|---|---|
| 3,749,953 A * | 7/1973 | Baumann et al. | 310/62 |
| 5,828,155 A * | 10/1998 | Adachi et al. | 310/263 |
| 5,936,326 A | 8/1999 | Umeda et al. | |
| 5,973,427 A * | 10/1999 | Suzuki et al. | 310/54 |
| 6,674,211 B2 * | 1/2004 | Katou et al. | 310/215 |
| 6,809,442 B2 * | 10/2004 | Kaneko et al. | 310/58 |
| 2001/0026102 A1 | 10/2001 | Asao et al. | |
| 2002/0135265 A1 | 9/2002 | Umeda | |
| 2002/0153799 A1 | 10/2002 | Kurahashi et al. | |
| 2005/0110358 A1 | 5/2005 | Maeda et al. | |
| 2005/0127774 A1 * | 6/2005 | Sogabe et al. | 310/215 |

FOREIGN PATENT DOCUMENTS

| | | |
|---|---|---|
| DE | 103 44 221 A1 | 5/2006 |
| JP | UM-A-S52-031801 | 3/1977 |
| JP | A 58-43157 | 3/1983 |
| JP | A-63-87143 | 4/1988 |

(Continued)

OTHER PUBLICATIONS

Japanese Office Action for Japanese Application No. 2005-207101, dated Jan. 22, 2010 with English Translation.

(Continued)

*Primary Examiner*—Nguyen N Hanh
(74) *Attorney, Agent, or Firm*—Oliff & Berridge, PLC (57) ABSTRACT

According to the present invention, a rotary electric machine includes a rotor with a rotary shaft, a stator surrounding an outer periphery of the rotor, and a frame supporting the rotor and the stator. Further, the stator has an outer surface at least part of which is exposed to outside of the frame, and a plurality of protrusions and recesses are formed on the exposed part of the outer surface of the stator, so as to enhance dissipation of heat generated by operation of the rotary electric machine. According to a further implementation of the present invention, the rotor includes at least one fan that works to create air flow, and the protrusions and the recesses are so formed that the recesses make up air flow paths, along which the air flow created by the fan passes over the outer surface of the stator, thereby cooling the outer surface.

12 Claims, 5 Drawing Sheets

DIRECTION OF
AIR FLOW

FOREIGN PATENT DOCUMENTS

| | | |
|---|---|---|
| JP | UM-A-S64-009465 | 1/1989 |
| JP | UM-A-H03-086765 | 9/1991 |
| JP | H-11-187599 | 7/1999 |
| JP | A-2001-211587 | 8/2001 |
| JP | A-2001-286099 | 10/2001 |
| JP | A-2002-136004 | 5/2002 |
| JP | A-2003-018779 | 1/2003 |
| JP | A-2003-158839 | 5/2003 |
| JP | A-2005-160172 | 6/2005 |
| WO | WO 2004/030185 A1 | 4/2004 |

OTHER PUBLICATIONS

Jun. 8, 2010 Office Action issued in Japanese Patent Application No. 2005-207101 (with translation).

* cited by examiner

ROTARY ELECTRIC MACHINE WITH STATOR OUTER SURFACE DESIGNED TO ENHANCE HEAT DISSIPATION

CROSS-REFERENCE TO RELATED APPLICATION

This application claims priority from Japanese Patent Application No. 2005-207101, filed on Jul. 15, 2005, the content of which is hereby incorporated by reference into this application.

BACKGROUND OF THE INVENTION

1 Technical Field of the Invention

The present invention relates generally to rotary electric machines. More particularly, the invention relates to a rotary electric machine for a vehicle (e.g., an automotive alternator), which includes a stator that has an outer surface designed to enhance the dissipation of heat generated by operation of the rotary electric machine.

2 Description of the Related Art

In recent years, engine compartments in vehicles have been increasingly required to be small, so as to meet the requirements of adopting a slant-nose design to reduce the vehicle running resistance and securing a more sufficient space in the vehicle compartments. Consequently, the space available for installation of an automotive alternator in the engine compartments has accordingly become small.

Further, the rotational speed of the engines has been reduced for the purpose of improving fuel economy; accordingly, the rotational speed of automotive alternators has also been reduced.

On the other hand, with the increase in electric load caused by, for example, employment of safety control devices, it is required to further increase the power capacity of automotive alternators.

Accordingly, it is required for automotive alternators to be compact, powerful, and non-expensive; thus, it is required for the components of automotive alternators to be highly densely arranged therein.

Moreover, with the recent development in reduction of engine noises, the noises caused by relatively high-speed engine accessories, particularly an automotive alternator, have become noticeable.

As an effort to reduce the automotive alternator noises, Japanese Patent First Publication No. S58-43157 discloses an automotive alternator wherein: a frame encloses the outer periphery of a stator core; the stator core has a plurality of protrusions formed on the outer surface thereof; a coolant flows through the hollow space formed between the inner surface of the frame and the outer surface of the stator core, thus cooling the stator core.

With the above configuration, it is possible to improve the cooling performance of the automotive alternator while reducing the leakage of noises from the automotive alternator to external.

However, at the same time, providing the hollow space for the flow of the coolant makes the automotive alternator redundant. Further, a piping system is necessary for supplying the coolant to the automotive alternator from, for example, an engine radiator; the piping system makes the arrangement of machines or devices in the engine compartment denser and more complex. Furthermore, to prevent leakage of the coolant, it is required to secure high precision of contact surfaces and high reliability of contacting portions in the automotive alternator and in the piping system.

SUMMARY OF THE INVENTION

The present invention has been made in view of the above-mentioned problems.

It is, therefore, an object of the present invention to provide a rotary electric machine which has an improved structure that ensures excellent cooling performance of the rotary electric machine while making the rotary electric machine compact.

It is another object of the present invention to provide a rotary electric machine which is quiet and has a high power capacity and a high reliability.

According to present invention, there is provided a rotary electric machine which includes: a rotor with a rotary shaft; a stator surrounding an outer periphery of the rotor; and a frame supporting the rotor and the stator, wherein the stator has an outer surface at least part of which is exposed to outside of the frame, and a plurality of protrusions and recesses are formed on the exposed part of the outer surface of the stator, so as to enhance dissipation of heat generated by operation of the rotary electric machine.

With the above structure, heat generated by operation of the rotary electric machine can be effectively dissipated to outside of the frame (i.e., outside of the rotary electric machine) directly from the exposed part of the outer surface of the stator.

Further, the surface area of the exposed part of the outer surface of the stator is increased, thus enhancing the dissipation of heat generated by operation of the rotary electric machine via the outer surface of the stator.

According to a further implementation of the invention, in the rotary electric machine, the rotor includes at least one fan that works to create air flow for cooling the rotary electric machine during the operation thereof, and the protrusions and the recesses are so formed on the outer surface of the stator that the recesses make up air flow paths, along which the air flow created by the fan passes over the outer surface of the stator, thereby cooling the outer surface.

Preferably, in the rotary electric machine, the rotor includes a first and a second fan that are disposed away from each other, ambient temperature around the first fan is lower than that around the second fan during the operation of the rotary electric machine, the first fan has a less airflow rate than the second fan, and the protrusions and the recesses are so formed on the outer surface of the stator that the recesses make up air flow paths, along which the air flow created by the first and second fans passes over the outer surface of the stator, thereby cooling the outer surface.

With the above configuration, the air flow created by the first and second fans can pass over the outer surface of the stator along the recesses on the outer surface from the first fan around which the ambient temperature is low to the second fan around which the ambient temperature is high, thereby more effectively cooling the outer surface of the stator.

Preferably, the first and second fans are respectively provided at axial ends of the rotor, and the protrusions and the recesses are so formed on the outer surface of the stator as to extend in the axial direction of the rotary shaft of the rotor and be alternately arranged in the circumferential direction of the rotary shaft of the rotor.

Preferably, in the rotary electric machine, the frame has a plurality of first discharge openings, through which the air flow created by the first fan is discharged, and a plurality of second discharge openings through which the air flow created by the second fan is discharged, and the position of each of the first and second discharge openings in the circumferential direction of the rotary shaft of the rotor is identical to that of one of the recesses on the outer surface of the stator.

With the above arrangement, the air flow created by the first and second fans can more smoothly pass over the outer surface of the stator core along the recesses on the outer surface from the first discharge openings to the second discharge openings, thereby further enhancing the cooling of the outer surface of the stator.

According to an embodiment of the invention, in the rotary electric machine, the stator includes: a stator core that has a plurality of slots formed therein and an outer surface representing the outer surface of the stator, a plurality of electrical conductors that have a substantially rectangular cross section and are provided in the slots of the stator core to form a stator winding, and a plurality of electrical insulators that are so provided in the slots of the stator core as to electrically insulate the electrical conductors from the stator core.

Preferably, in the rotary electric machine, each of the electrical conductors is arranged in one of the slots of the stator core in abutment with at least one inner face of the one of the slots via a corresponding one of the electrical insulators.

With the above arrangement, heat generated by the electric conductors can be effectively transmitted to the stator core and then dissipated via the outer surface of the stator core.

Further, in the rotary electric machine, the stator core has a plurality of teeth each of which separates adjacent two of the slots of the stator core in the circumferential direction of the rotary shaft of the rotor, and it is preferable that the position of each of the protrusions on the outer surface of the stator core in the circumferential direction of the rotary shaft of the rotor is identical to that of one of the teeth of the stator core.

With the above arrangement, it is possible to effectively dissipate the heat, which is transmitted from the electrical conductors to the teeth of the stator core, via the protrusions, thereby improving the cooling performance of the rotary electric machine.

In the rotary electric machine, there may be a vacant space in each of the slots of the stator core, and it is preferable that a ratio of an area of the vacant space to a gross area of the each of the slots on a reference plane is equal to or less than 25%, the reference plane being defined to extend along a circumferential direction of the rotary shaft of the rotor.

Specifying the above ratio, it is possible to secure a high space factor of the stator winding that is made up of the electric conductors. Moreover, it is possible to limit the size of the vacant space, which is filled with air having low heat conductivity, thereby allowing heat generated by the electric conductors to be more effectively transmitted to the stator core and then dissipated via the outer surface of the stator core.

Otherwise, in the rotary electric machine, spaces in the slots of the stator core, which are not occupied by the electrical conductors and the electrical insulators, are filled with a resin material up to the inner surface of the stator core.

In this case, since the resin material has greater heat conductivity than air, heat generated by the electric conductors can be further effectively transmitted to the stator core and then dissipated via the outer surface of the stator core. Moreover, since the average gap between the outer surface of the rotor and the inner surface of the stator is reduced, it becomes easier for heat generated by the rotor to be transmitted to the stator and then dissipated via the outer surface of the stator core. Furthermore, since the gap between the outer surface of the rotor and the inner surface of the stator is uniformalized along the circumferential direction of the rotary shaft of the rotor, noises generated during rotation of the rotor due to interference between the rotor and the stator can be considerably reduced, thereby making the rotary electric machine quieter.

Preferably, in the rotary electric machine, the rotor includes a rotor core having a plurality of claws, a field winding wound around the rotor core, and a plurality of permanent magnets that are arranged between adjacent twos of the claws of the rotor core.

In this case, leakage of magnetic flux from the gaps between the claws of the rotor core can be reduced, thereby increasing the power output of the rotary electric machine.

BRIEF DESCRIPTION OF THE DRAWINGS

The present invention will be understood more fully from the detailed description given hereinafter and from the accompanying drawings of the preferred embodiment of the invention, which, however, should not be taken to limit the invention to the specific embodiment but are for the purpose of explanation and understanding only.

In the accompanying drawings.

DESCRIPTION OF THE PREFERRED EMBODIMENT

The preferred embodiment of the present invention will be described hereinafter with reference to FIGS. 1-4.

It should be noted that, for the sake of clarity and understanding, identical components having identical functions have been marked with the same reference numerals in each of the figures.

Figure 1:
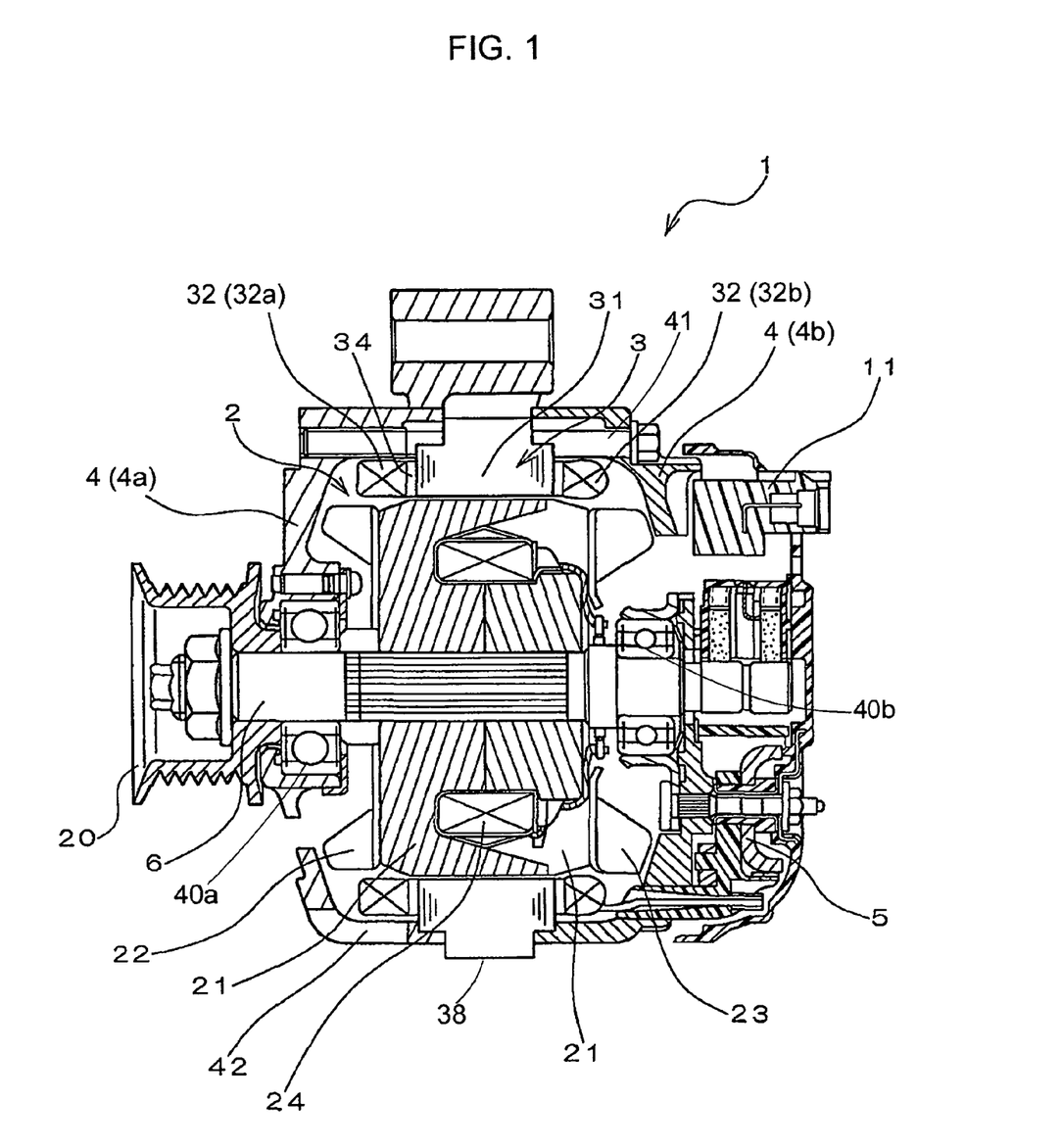
FIG. 1 is a partially cross-sectional view showing the overall structure of an automotive alternator according to an embodiment of the invention.

FIG. 1 shows the overall structure of an automotive alternator 1 according to an embodiment of the present invention.

As shown in FIG. 1, the automotive alternator 1 includes a rotor 2, a stator 3, a frame 4, a rectifier 5, a voltage regulator 11, and a pulley 20.

The rotor 2 works to create a rotating magnetic field. The rotor 2 includes a rotary shaft 6, a lundell-type rotor core 21 that has a plurality of claws and is mounted on the rotary shaft 6, a pair of cooling fans 22 and 23, and a field winding 24 wound around the rotor core 21.

The cooling fan 22 is fixed to the pulley-side axial end of the rotor core 21 by welding. On the other hand, the cooling fan 23 is fixed to the non-pulley-side (i.e., the rectifier-side) axial end of the rotor core 21 by welding. During operation of the automotive alternator 1, the ambient temperature on the pulley side will be lower than that on the non-pulley side. In the present embodiment, the numbers and sizes of fan blades for the cooling fans 22 and 23 are so set that the cooling fan 22 has a less airflow rate than the cooling fan 23.

The stator 3 is so arranged as to surround the outer periphery of the rotor 2. The stator 3 works to generate an AC power in the rotating magnetic field created by the rotor 2.

Referring to FIGS. 1-4, the stator 3 includes a stator core 31 that has a plurality of slots 35 formed therein, a plurality of electrical conductors 32 that are arranged in the slots 35 of the stator core 31 to form a stator winding, and a plurality of electrical insulators 34 that are so arranged in the slots 35 of the stator core 31 to insulate the electrical conductors 32 from the stator core 31.

The stator core 31 is a laminated core that is obtained by laminating annular thin steel sheets. The stator core 31 has an outer surface part of which is exposed to outside of the frame 4. Further, on the exposed part of the outer surface of the stator core 31, a plurality of valleys 37 and ridges 38 are formed.

Specifically, the valleys 37 and the ridges 38 are so formed on the outer surface of the stator core 31 as to extend in the axial direction of the rotor 2 (i.e., the axial direction of the rotary shaft 6 of the rotor 2) and be alternately arranged in the circumferential direction of the rotor 2 (i.e., the circumferential direction of the rotary shaft 6 of the rotor 2). Further, the valleys 37 and the ridges 38 are exposed to outside of the frame 4. More specifically, the ridges 38 have an outer diameter greater than the diameter of the outer surface of the frame 4 except stay portions of the frame 4.

Figure 2:
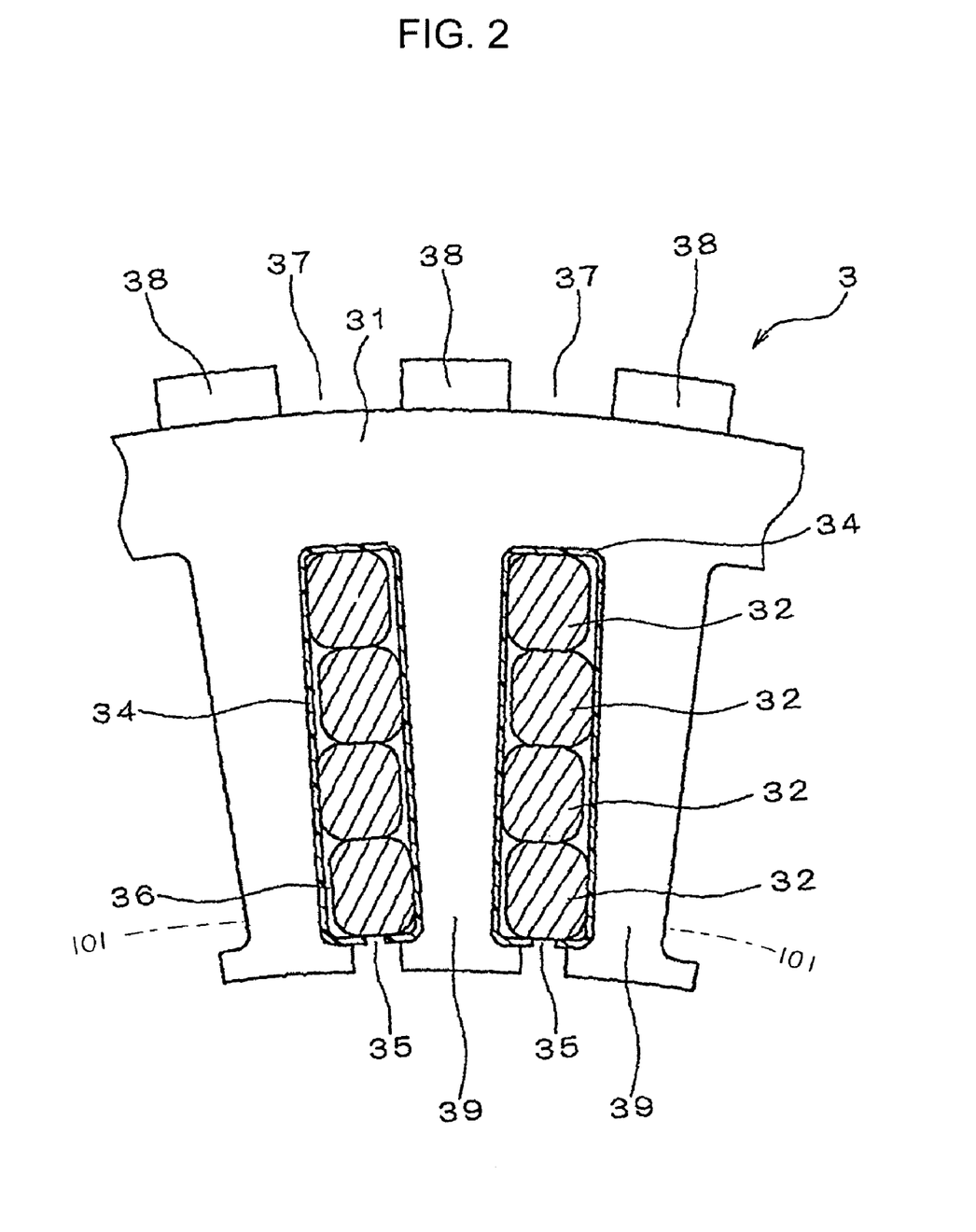
FIG. 2 is a partially cross-sectional view showing the structure of a stator in the automotive alternator of FIG. 1.

Further, as shown in FIG. 2, the stator core 31 has a plurality of teeth 39 each of which separates adjacent two of the slots 35 in the circumferential direction of the rotor 2. In addition, in the present embodiment, the position of each of the ridges 38 on the outer surface of the stator core 31 in the circumferential direction of the rotor 2 is identical to that of one of the teeth 39 of the stator core 31.

Figure 3:
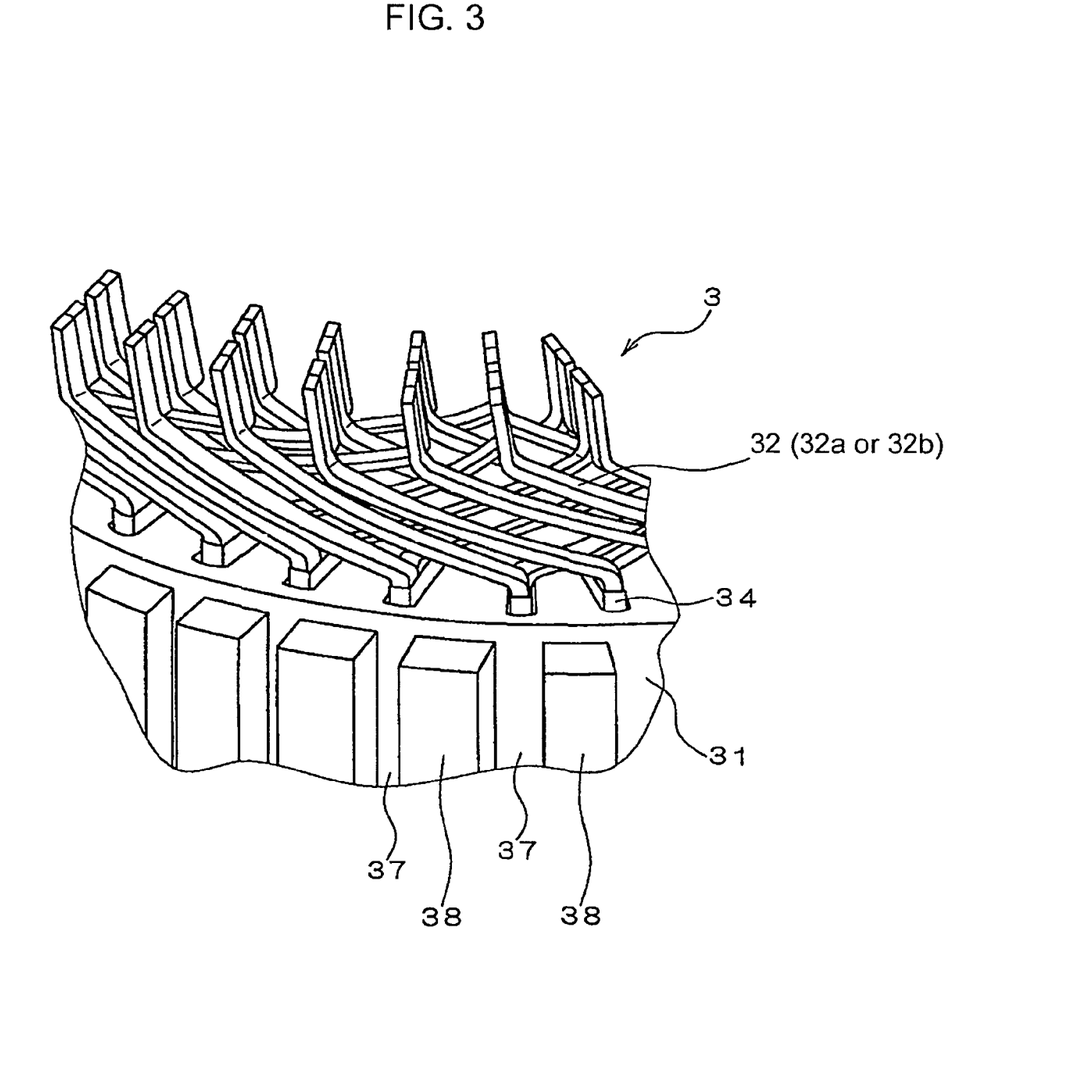
FIG. 3 is a perspective view showing an end portion of the stator of FIG. 2.

The electrical conductors 32 have, as shown in FIG. 2, a substantially rectangular cross section perpendicular to the axial direction of the rotor 2. Each of the electrical conductors 32 is so provided in one of the slots 35 of the stator core 31 as to abut at least one inner face of the one of the slots 35 via a corresponding one of the electrical insulators 34. Further, as shown in FIGS. 1 and 3, each of the electric conductors 32 has a pulley-side protruding portion 32a protruding from the pulley-side axial end of the stator core 31 and a non-pulley-side protruding portion 32b protruding from the non-pulley-side axial end of the stator core 31.

In each of the slots 35 of the stator core 31, there is a vacant space 36 which is not occupied by the electrical conductors 32 and the electrical insulators 34. In the present embodiment, a ratio of an area of the vacant space 36 in each of the slots 35 to a gross area of the each of the slots 35 on an arbitrary reference plane 101 is specified to be less than or equal to 25%. Here, the arbitrary reference plane 101 is defined to extend along the circumferential direction of the rotor 2, in other words, to extend perpendicular to the radial direction of the rotor 2.

Figure 4:
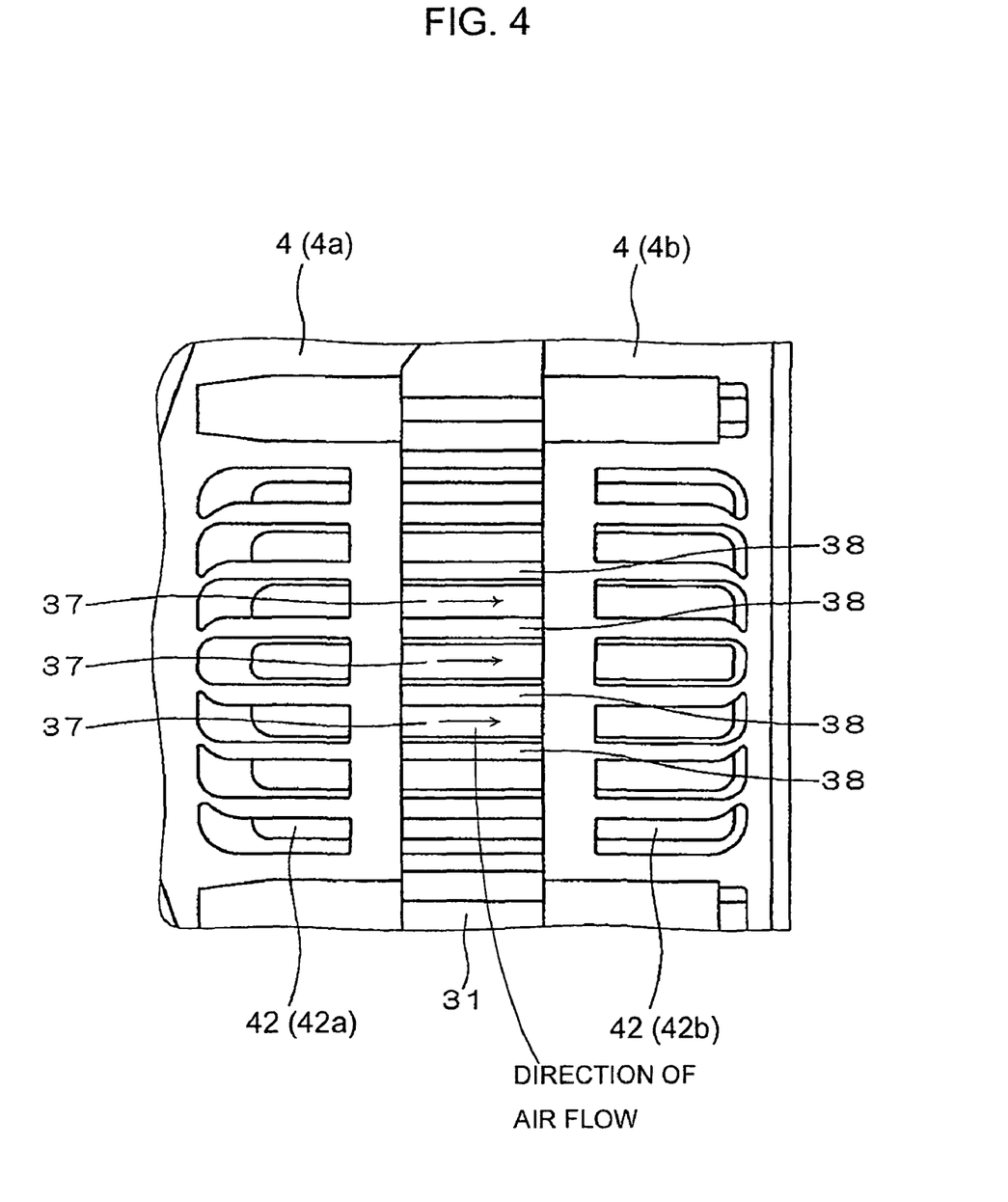
FIG. 4 is a side view illustrating the structural relationship between a frame and a stator core in the automotive alternator of FIG. 1.

Referring to FIGS. 1 and 4, the frame 4 is composed of a pulley-side frame 4a and a non-pulley-side frame 4b. The frame 4 supports the rotary shaft 6 of the rotor 2 via bearings 40a and 40b that are respectively provided in the pulley-side frame 4a and the non-pulley-side frame 4b, thereby supporting the rotor 2. Further, the pulley-side frame 4a and the non-pulley-side frame 4b together support the stator 3 by clamping outer areas of both the pulley-side and non-pulley-side axial ends of the stator core 31 using a plurality of fixing bolts 41.

The frame 4 has a plurality of discharge openings 42 formed therein. More specifically, the discharge openings 4 include a plurality of pulley-side discharge openings 42a and a plurality of non-pulley-side discharge openings 42b. The pulley-side discharge openings 42a are formed in the pulley-side frame 4a and arrange on the outer periphery of the pulley-side protruding portions 32a of the electric conductors 32, so as to discharge the air flow created by the cooling fan 22. On the hand, the non-pulley-side discharge openings 42b are formed in the non-pulley-side frame 4b and arranged on the outer periphery of the non-pulley-side protruding portions 32b of the electric conductors 32, so as to discharge the air flow created by the cooling fan 23. Further, in the present embodiment, the position of each of the pulley-side discharge openings 42a and non-pulley-side discharge openings 42b in the circumferential direction of the rotor 2 is identical to that of one of the valleys 37 on the outer surface of the stator core 31.

The rectifier 5 is electrically connected to the electric conductors 32 of the stator 3 and configured to convert the AC power generated by the stator 3 into a DC power.

The voltage regulator 11 is configured to regulate an output voltage of the automotive alternator 1 by controlling a field current supply to the field winding 24 of the rotor 2.

The pulley 20 is mounted on the rotary shaft 6 of the rotor 2 to transmit a driving force from an engine to the automotive alternator 1.

The above-described automotive alternator 1 according to the present embodiment has the following advantages.

In the automotive alternator 1, the stator core 31 has an outer surface part of which is exposed to outside of the frame 4.

Consequently, heat generated by operation of the automotive alternator 1 can be effectively dissipated to outside of the frame 4 (i.e., outside of the automotive alternator 1) directly from the exposed part of the outer surface of the stator core 31.

Further, on the exposed part of the outer surface of the stator core 31, the plurality of valleys 37 and ridges 38 are formed.

Consequently, the surface area of the exposed part of the outer surface of the stator core 31 is increased, thus enhancing the dissipation of heat generated by operation of the automotive alternator 1 via the outer surface of the stator core 31.

In the automotive alternator 1, the rotor 2 includes the cooling fans 22 and 23 respectively at the pulley-side and non-pulley-side axial ends thereof; the valleys 37 and the ridges 38 are so formed on the outer surface of the stator core 31 to extend in the axial direction of the rotor 2 and be alternately arranged in the circumferential direction of the rotor 2.

With the above formation, the valleys 37 make up axial air flow paths, along which the air flow created by the cooling fans 22 and 23 passes over the outer surface of the stator core 31, thereby effectively cooling the outer surface of the stator core 31.

In the automotive alternator 1, the cooling fan 22 on the pulley side has the less airflow rate than the cooling fan 23 on the non-pulley side; the ambient temperature on the pulley side will be lower than that on the non-pulley side during operation of the automotive alternator 1.

Consequently, the air flow created by the cooling fans 22 and 23 can pass over the outer surface of the stator core 31 along the valleys 37 from the pulley side to the non-pulley side, thereby more effectively cooling the outer surface of the stator core 31.

In the automotive alternator 1, each of the electric conductors 32 has the substantially rectangular cross section and is arranged in one of the slots 35 of the stator core 31 in abutment with at least one inner face of the one of the slots 35 via the corresponding one of the electric insulators 34.

With the above arrangement, heat generated by the electric conductors 32 can be effectively transmitted to the stator core 31 and then dissipated via the outer surface of the stator core 31.

In the automotive alternator 1, the ratio of the area of the vacant space 36 in each of the slots 35 of the stator core 31 to the gross area of the each of the slots 35 on the arbitrary reference plane 101 is specified to be less than or equal to 25%.

Specifying the upper limit of the ratio as above, it is possible to secure a high space factor of the stator winding that is made up of the electric conductors 32. Moreover, it is possible to limit the size of the vacant space 36, which is filled with air having low heat conductivity, thereby allowing heat generated by the electric conductors 32 to be more effectively transmitted to the stator core 31 and then dissipated via the outer surface of the stator core 31.

In the automotive alternator 1, the position of each of the pulley-side discharge openings 42a and non-pulley-side discharge openings 42b in the circumferential direction of the rotor 2 is identical to that of one of the valleys 37 on the outer surface of the stator core 31.

With the above arrangement, the air flow created by the cooling fans 22 and 23 can more smoothly pass over the outer surface of the stator core 31 along the valleys 37 from the pulley-side discharge openings 42a to the non-pulley-side discharge openings 42b, thereby further effectively cooling the outer surface of the stator core 31.

In the automotive alternator 1, the position of each of the ridges 38 on the outer surface of the stator core 31 in the circumferential direction of the rotor 2 is identical to that of one of the teeth 39 of the stator core 31.

With the above arrangement, it is possible to effectively dissipate the heat, which is transmitted from the electrical conductors 32 to the teeth 39 of the stator core 31, via the ridges 38, thereby improving the cooling performance of the automotive alternator 1.

Accordingly, the automotive alternator 1 according to the present embodiment has excellent cooling performance while being compact, powerful, quiet, and reliable.

While the above particular embodiment of the invention has been shown and described, it will be understood by those who practice the invention and those skilled in the art that various modifications, changes, and improvements may be made to the invention without departing from the spirit of the disclosed concept.

For example, in the previous embodiment, there is the vacant space 36 in each of the slots 35 of the stator core 31, as shown in FIG. 2.

Figure 5:
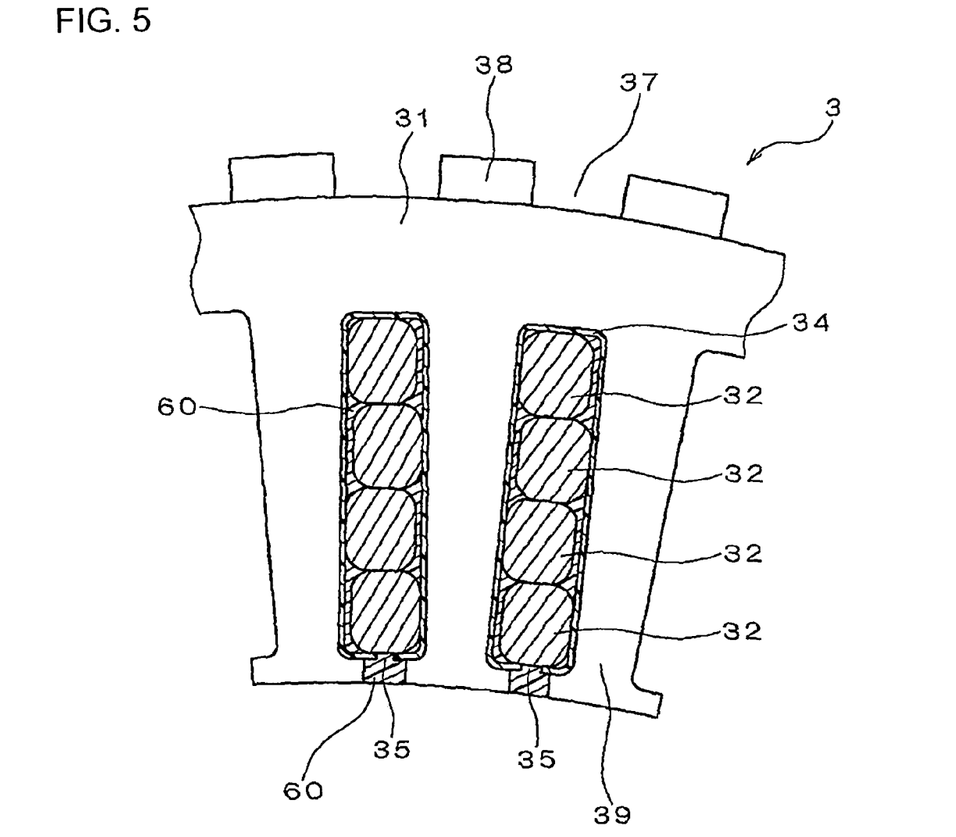
FIG. 5 is a partially cross-sectional view showing a variation of the stator of FIG. 2.

However, the spaces in the slots 35 of the stator core 31, which are not occupied by the electrical conductors 32 and the electrical insulators 34, may be filled with a resin material 60 up to the inner surface of the stator core 31, as shown in FIG. 5.

In this case, since the resin material 60 has greater heat conductivity than air, heat generated by the electric conductors 32 can be more effectively transmitted to the stator core 31 and then dissipated via the outer surface of the stator core 31. Moreover, since the average gap between the outer surface of the rotor 2 and the inner surface of the stator 3 is reduced, it becomes easier for heat generated by the rotor 2 to be transmitted to the stator 3 and then dissipated via the outer surface of the stator core 31. Furthermore, since the gap between the outer surface of the rotor 2 and the inner surface of the stator 3 is uniformalized along the circumferential direction of the rotor 2, noises generated during rotation of the rotor 2 due to interference between the rotor 2 and the stator 3 can be considerably reduced, thereby making the automotive alternator 1 quieter.

Figure 6:
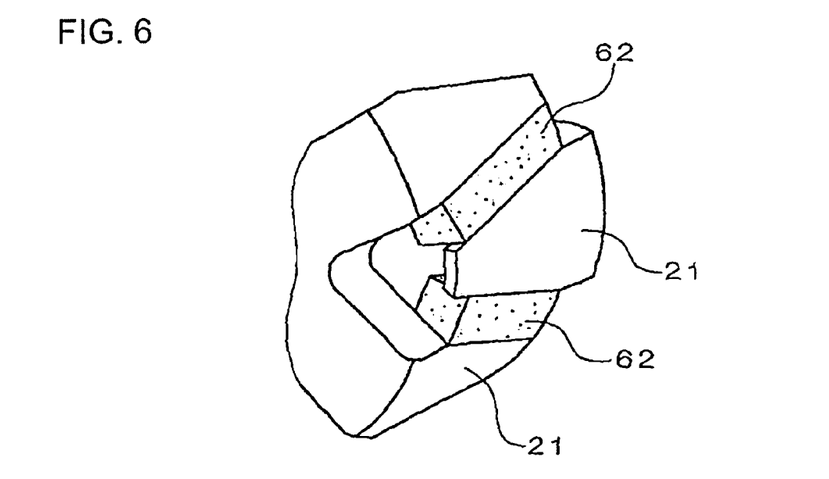
FIG. 6 is a perspective view showing a variation of a rotor in the automotive alternator of FIG. 1.

Moreover, as shown in FIG. 6, the rotor 2 may further include a plurality of permanent magnets 62, each of which is so arranged between adjacent two of the claws of the rotor core 21 as to fill the gap therebetween in the vicinity of the outer surface of the rotor 2.

In this case, leakage of magnetic flux from the gaps between the claws of the rotor core 21 can be reduced, thereby increasing the power output of the automotive alternator 1. Further, the permanent magnets 62 may be configured with strong rare earth permanent magnets, so that the power output of the automotive alternator 1 can be further increased. In addition, the rare earth permanent magnets may be permanently deteriorated at high temperatures. However, according to the present invention, since heat generated by the stator 3 is dissipated via the outer surface of the stator core 31 rather than radiated to the rotor 2, the permanent magnets 62 can be prevented from being permanently deteriorated due to excessive heat and thus both the high power output and the high reliably of the automotive alternator 1 can be ensured.

In the previous embodiment, the rotor 2 is configured to include the cooling fans 22 and 23 respectively at the pulley-side and non-pulley-side axial ends thereof.

However, the rotor 2 may also be configured to include only the cooling fan 22 at the pulley-side axial end thereof.

In the previous embodiment, the stator core 31 is formed with a laminated core that is obtained by laminating annular thin steel sheets; the stator 3 is obtained by arranging the electrical conductors 32 and the electrical insulators 34 in the slots 35 of the stator core 31.

However, the stator 3 may also be obtained according to a method disclosed in Japanese Patent First Publication No. H09-103052. Specifically, the stator 3 may be obtained by the steps of: laminating thin steel sheets having a band shape to form a cuboid lamination that has the valleys 37 and ridges 38 formed on a side face thereof; forming the slots 35 in the cuboid lamination; arranging the electrical conductors 32 and the electrical insulators 34 in the slots 35; and bending the cuboid lamination into the cylindrical stator core 31.

In this case, with the valleys 37 and ridges 38 on the side face of the cuboid lamination, the bending step can be performed more easily. Further, according to the method, it is possible to more densely arrange the electrical conductors 32 in the slots 35, thereby improving the space factor of the stator winding that is made up of the electric conductors 32 and enhancing the heat transmission from the electrical conductors 32 to the stator core 31.

In the previous embodiment, the present invention is directed to the automotive alternator 1.

However, the present invention may also be applicable to other types of rotary electric machines.

Such modifications and variations are possible within the scope of the appended claims.

What is claimed is:

1. A rotary electric machine comprising:
   a rotor with a rotary shaft;
   a stator surrounding an outer periphery of the rotor; and
   a frame supporting the rotor and the stator,
   wherein the stator has an outer surface at least part of which is exposed to outside of the frame, and
   a plurality of protrusions and recesses are formed on the exposed part of the outer surface of the stator, so as to enhance dissipation of heat generated by operation of the rotary electric machine,
   wherein:

the rotor includes first and second fans that are disposed away from each other and create air flow for cooling the rotary electric machine during the operation thereof, ambient temperature around the first fan is lower than that around the second fan during the operation of the rotary electric machine, the first fan has a less airflow rate than the second fan, and the protrusions and the recesses are so formed on the outer surface of the stator that the recesses make up air flow paths, along which the air flow created by the first and second fans passes over the outer surface of the stator, thereby cooling the outer surface.

2. The rotary electric machine as set forth in claim 1, wherein the first and second fans are respectively provided at opposite axial ends of the rotor, and the protrusions and the recesses are so formed on the outer surface of the stator as to extend in an axial direction of the rotary shaft of the rotor and be alternately arranged in a circumferential direction of the rotary shaft of the rotor.

3. The rotary electric machine as set forth in claim 2, wherein the frame has a plurality of discharge openings formed therein, through which the air flow created by the first and second fans is discharged, and wherein a position of each of the discharge openings in the circumferential direction of the rotary shaft of the rotor is identical to that of one of the recesses on the outer surface of the stator.

4. The rotary electric machine as set forth in claim 3, wherein the stator includes:

a stator core that has a plurality of slots formed therein and an outer surface representing the outer surface of the stator, a plurality of electrical conductors that have a substantially rectangular cross section and are provided in the slots of the stator core to form a stator winding, and a plurality of electrical insulators that are so provided in the slots of the stator core as to electrically insulate the electrical conductors from the stator core, and wherein, the electrical conductors have respective protruding portions that protrude from an axial end of the stator core, and the discharge openings of the frame are formed on radially outer peripheries of the protruding portions of the electrical conductors at the axial ends of the stator core.

5. The rotary electric machine as set forth in claim 1, wherein the stator includes:

a stator core that has a plurality of slots formed therein and an outer surface representing the outer surface of the stator, a plurality of electrical conductors that have a substantially rectangular cross section and are provided in the slots of the stator core to form a stator winding, and a plurality of electrical insulators that are so provided in the slots of the stator core as to electrically insulate the electrical conductors from the stator core.

6. The rotary electric machine as set forth in claim 5, wherein each of the electrical conductors is provided in one of the slots of the stator core in abutment with at least one inner face of the one of the slots via a corresponding one of the electrical insulators.

7. The rotary electric machine as set forth in claim 5, wherein, each of the slots of the stator core includes therein a vacant space, and a ratio of an area of the vacant space to a gross area of the each of the slots on a reference plane is equal to or less than 25%, the reference plane being defined to extend along a circumferential direction of the rotary shaft of the rotor.

8. The rotary electric machine as set forth in claim 5, wherein spaces in the slots of the stator core, which are not occupied by the electrical conductors and the electrical insulators, are filled with a resin material up to an inner surface of the stator core.

9. The rotary electric machine as set forth in claim 5, wherein the stator core has a plurality of teeth each of which separates two adjacent slots of the stator core in a circumferential direction of the rotary shaft of the rotor, and wherein a position of each of the protrusions on the outer surface of the stator core in the circumferential direction of the rotary shaft of the rotor is identical to that of one of the teeth of the stator core.

10. The rotary electric machine as set forth in claim 1, wherein the rotor includes a rotor core having a plurality of claws, a field winding wound around the rotor core, and a plurality of permanent magnets that are arranged between two adjacent claws of the rotor core.

11. The rotary electric machine as set forth in claim 1, wherein the rotary electric machine is for use in a vehicle.

12. The rotary electric machine as set forth in claim 11, wherein the rotary electric machine is an automotive alternator.

* * * * *